United States Patent [19]
Simpson, Jr.

[11] Patent Number: 4,922,515
[45] Date of Patent: May 1, 1990

[54] COMMUNICATION NETWORK CUT-OFF DETECTION ARRANGEMENT

[75] Inventor: Raymond A. Simpson, Jr., Marietta, Ga.

[73] Assignee: American Telephone and Telegraph Company, New York, N.Y.

[21] Appl. No.: 384,952

[22] Filed: Jul. 25, 1989

[51] Int. Cl.$^5$ .............................................. H04M 3/24
[52] U.S. Cl. ........................................ 379/6; 379/32; 379/34
[58] Field of Search .......................... 379/6, 2, 5, 8, 10, 379/22, 32, 34

[56] References Cited

U.S. PATENT DOCUMENTS

| | | |
|---|---|---|
| 3,231,677 | 1/1966 | Edstrom et al. ........................ 379/6 |
| 4,021,624 | 5/1977 | Kelly et al. . |
| 4,238,649 | 12/1980 | Kemler . |
| 4,255,625 | 3/1981 | Walton et al. . |
| 4,467,148 | 8/1984 | Stafford et al. . |

Primary Examiner—Stafford D. Schreyer
Attorney, Agent, or Firm—J. S. Cubert

[57] ABSTRACT

Cut-off malfunctions in a communication network are lcoated by establishing a connection through the network between a first terminal and a second terminal. At the first terminal, a prescribed sequence of first signals is generated and applied to the established network connection. At the second terminal, a second signal is generated responsive to receipt of a first signal over the established connection and the second signal is applied to the established network connection. A signal representing the difference between the number of first signals applied to the established connection and the number of second signals received from the established connection is formed at the first terminal. The established connection is maintained for testing when the difference signal exceeds a predetermined number.

17 Claims, 5 Drawing Sheets

COMMUNICATION NETWORK CUT-OFF DETECTION ARRANGEMENT

FIELD OF THE INVENTION

The invention relates to fault location in communication networks and, more particularly, to arrangements for detecting cut-off conditions in a telephone network.

BACKGROUND OF THE INVENTION

Devices for testing communication networks such as telephone or data systems by simulating calls through exchanges or trunks are well known. Generally, such simulators are adapted to rapidly apply the sequence of call signals through the circuits of an exchange and test the responses thereto. In this way, the operation of the exchange is evaluated and faulty equipment identified without interrupting subscriber service.

U.S. Pat. No. 4,021,624 issued to Kelly et al, May 3, 1977, discloses an automatic call generator connectable with the main distribution frame of a common control telephone system that monitors the operation of the system. The automatic call generator is connected to dedicated line and trunk circuit ports and attempts to place calls from one dedicated spot to another. If the system fails to terminate a call within a prescribed period of time, a malfunction is noted. Two malfunctions within a prescribed set of programs for monitoring the system cause a system alarm to be generated. The call generator also tests itself after proceeding through assigned programs for monitoring the system.

U.S. Pat. No. 4,238,649 issued to Marc Kemler, Dec. 9, 1980, discloses a traffic simulator for tandem exchange testing. The simulator comprises a calling side module to simulate a calling exchange with facilities for the selection of dialing information, type of test operation and signaling code. The calling side module is connected to the tandem exchange at an i/c circuit terminating equipment of a type suited to the selected signaling code. An answering side module connected to the tandem exchange at an o/g circuit terminating equipment simulates a called exchange and comprises means for selection of the signaling code for communication with the terminating equipment. The two modules are independent and a signal flows between them passing exclusively through the tandem exchange.

U.S. Pat. No. 4,255,625 issued to Walton et al, Mar. 10, 1981, discloses a call processing monitor system for dynamically verifying the operation of a telephone switching center. The system provides for continuously testing a telephone switching center's ability to process telephone traffic by placing telephone calls one at a time from various network inlets to various network outlets in the switching center. Upon detection of a predetermined number of consecutive failures, an output alarm signal is generated by the system.

U.S. Pat. No. 4,467,148 issued to Stafford et al, Aug. 21, 1984, discloses a telephone line analyzer that provides automatic attenuation measurement of tie trunk lines and other telephone lines through measurement of the electrical level of a tone responder. The analyzer is primarily directed to testing telephone lines interconnected between trunk line selectable computerized private branch exchanges (PBXs) of the same user. The analyzer automatically dials a remote PBX through a desired tie trunk line, activates a remote tone responder, and measures and records the test results. The analyzer may also perform echo return loss measurements.

The testing arrangements described in the aforementioned patents provide periodic tests that assure the integrity of portions of a network. Such testing is generally effective to provide adequate service to subscribers. There are malfunctions, however, that occur sporadically. Although these occurrences are uncommon, they may occur repeatedly on particular calls and thereby seriously affect a particular subscriber. Cut-off of an already established connection through a network is usually solved by a subscriber by redialing. Repeated cut-offs on calls between particular subscribers or areas, however, are evidence of degraded service that requires correction. The problem may be caused by marginal equipment in the particular network configuration used in the connection. The aforementioned arrangements are not adapted to determine the source of such malfunctions. It is an object of the invention to provide improved detection of cut-off in a network to facilitate corrective action.

BRIEF SUMMARY OF THE INVENTION

The invention is directed to an arrangement for detecting network cut-off malfunctions in which a connection is established through the network between first and second terminals known to experience cut-off. A sequence of first type voice frequency signals are applied to the connection from the first terminal for a predetermined time. A second type voice frequency signal is applied to the established connection from the second terminal responsive to receipt of a first type signal from the established connection. The difference between the number of first type signals generated in the first terminal and the number of second type signals received at the first terminal is monitored. Responsive to the difference exceeding a prescribed number, the established connection is maintained active so that the faulty equipment in the connection may be located.

DETAILED DESCRIPTION

Figure 1:
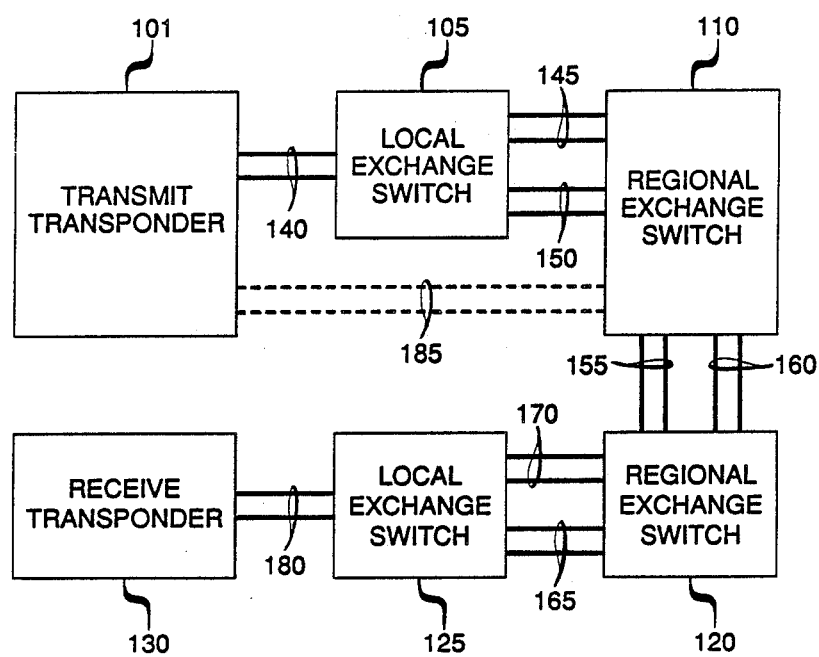
FIG. 1 depicts a general block diagram of a cut-off detection arrangement in a communication system illustrative of the invention.

FIG. 1 shows a cut-off detection test arrangement in a telephone network illustrative of the invention. The network includes local exchange switches 105 and 125 adapted to connect subscribers to the network and regional exchange switches 110 and 120 adapted to interconnect the local exchange switches. Subscriber equipment is generally connected to the local exchange via two wire lines while interconnections between the local exchange switches and regional exchange switches and among regional exchange switches comprise four wire lines. The four wire line between local exchange switch 105 and regional exchange switch 110 comprises send line 145 and receive line 150. The four wire line between regional exchange switches 110 and 120 includes send line 160 and receive line 155. These four wire lines generally extend long distances and include a plurality of repeaters and other connections.

A call connection may be established through the network as shown in FIG. 1 from two wire line 140 to two wire line 180 via a path through local exchange 105, regional exchanges 110 and 120 and local exchange 125. There may be more than two regional exchanges involved in the call path. With reference to FIG. 1, a subscriber on line 140 may establish a connection to another subscriber on line 180 through the described network path. If there is an unwanted cut-off during the call, the connection may be reestablished by redialing. In the event the subscriber experiences repeated cut-offs to a particular destination on the network, the condition will be reported to the service provider. Such cut-offs are usually caused by marginal equipment in the connection path which are not detected during routine testing of exchanges and trunks.

In order to correct the repeated cut-off condition, the path subject to cut-off must be reestablished to permit location of the malfunctioning equipment. In the arrangement of FIG. 1, transponders are installed at each subscriber end of the connection experiencing cut-off. Transmit transponder 101 is placed at subscriber line 140 and receive transponder 130 is placed at subscriber line 180. The transmit transponder establishes a connection to the receive transponder by an automatic dialing circuit. The receive transponder returns a signal indicating that a connection path has been completed. Upon receipt of the signal from receive transponder 130, transmit transponder 101 sends a sequence of multifrequency coded signals over the connection path. Voice frequency bursts are returned to the transmmit transponder from the receive transponder 130 in response to detected multifrequency coded signals.

Each multifrequency coded signal generated in the transmit transponder causes a counter therein to be incremented. The counter in the transmit transponder is reset to an initial state upon detection of each returned voice frequency burst. As long as the counter is reset by a tone burst through the established connection, the transmit transponder is allowed to send a disconnect signal upon termination of the sequence of multifrequency coded signals. The operations of setting up the connection and exchanging signals are repeated so that all possible connection paths are tested. Since cut-off difficulties were previously reported between the terminals, the procedure is likely to detect a cut-off condition.

If the counter in transmit transponder 101 is incremented to a predetermined number, e.g., 4, an alert indicator is set and the disconnect signal is inhibited. The incrementing of the counter to the predetermined number indicates that either the receive transponder has failed to detect the multifrequency coded signal from the transmit transponder or that no return voice frequency bursts have been received from the receive transponder responsive to several multifrequency coded signals. Consequently, the connection path is subject to cut-off. The defective connection path is held since disconnect has been inhibited. The trunks and exchange equipment involved in the connection path may then be tested. In this way, the defective path is located without the constant attention of repair personnel.

The transmit transponder in FIG. 1 may be connected to local exchange 105 through subscriber line 140 as shown. If it is determined that the subscriber equipment and line 140 is not at fault, the transponder may be placed at local exchange 105. Transponder 101 may also be placed at regional exchange switch 110 through a two wire line 185 shown in dashed lines when equipment between the subscriber and local exchange 105 and between local exchange 105 and regional exchange 110 have already been tested. Similarly, receive transponder 130 may be placed at local exchange switch 125 or may be connected to regional exchange switch 120 through a two wire line not shown.

Figure 2:
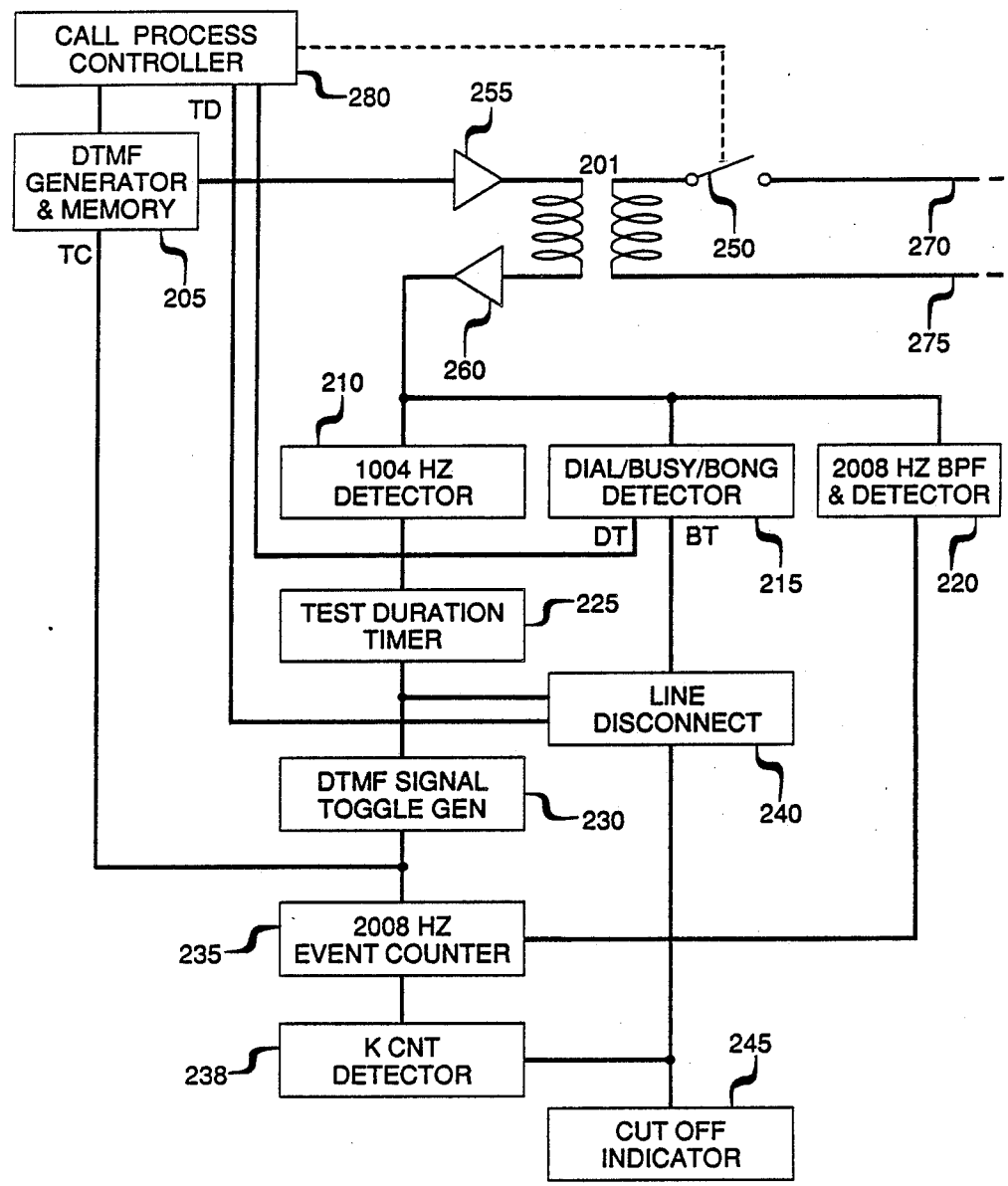
FIG. 2 is a block diagram of a circuit that may be used as the transmit transponder in the arrangement of FIG. 1.
Figure 4:
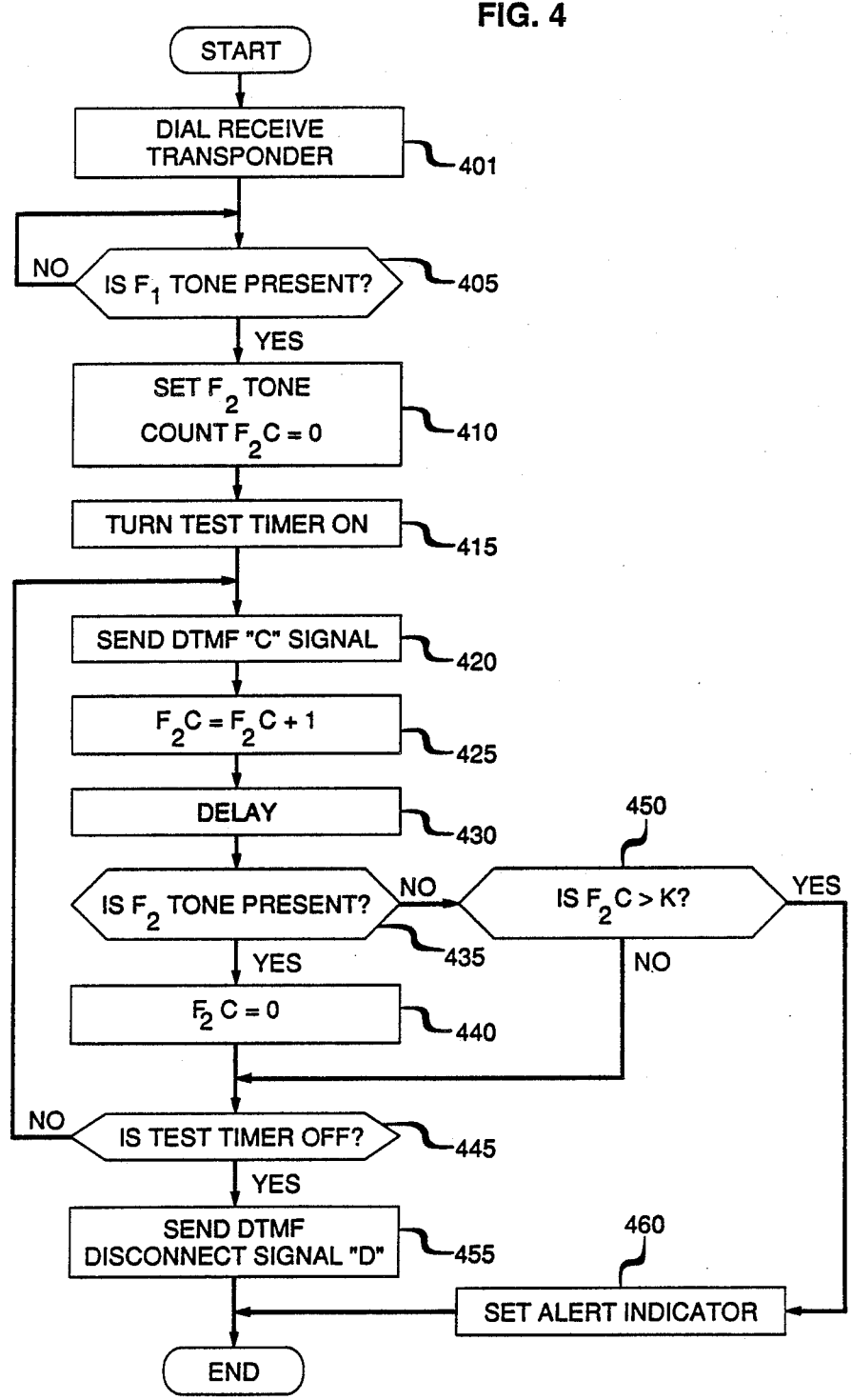
FIG. 4 is a flowchart illustrating the operation of the transmit transponder circuit of FIG. 2.

FIG. 2 shows a block diagram of transmit transponder 101 of FIG. 1 and the flowchart of FIG. 4 illustrates its operation. In FIG. 2, call process controller 280 is adapted to control setting up of call to receive transponder 130 and the call disconnect. DTMF generator and memory operates to outpulse multifrequency coded signals to tip 270 and ring 275 through amplifier 255 and line transformer 201. Incoming signals are coupled through amplifier 260 to the inputs of 1004 Hz detector 210, dial/busy/bong detector 215 and 2008 Hz band pass filter and detector 220. Test duration timer 225 determines the total test time and therefore the number of multifrequency coded signals in the test sequence. DTMF signal toggle generator 230 activates DTMF generator 205 to produce multifrequency coded signals. Counter 235 counts the number of multifrequency coded signals which may be "C" coded signals until reset by the output of detector 220 and K count detector is activated when a count of K is reached in counter 235. Line disconnect circuit 240 produces the disconnect signal which is sent to call control processor 280. The line disconnect signal is inhibited by detection of a K count in detector 238. Cut-off indicator 245 is also activated by detector 238 to alert test personnel to a detected connection path cut-off condition.

Figure 3:
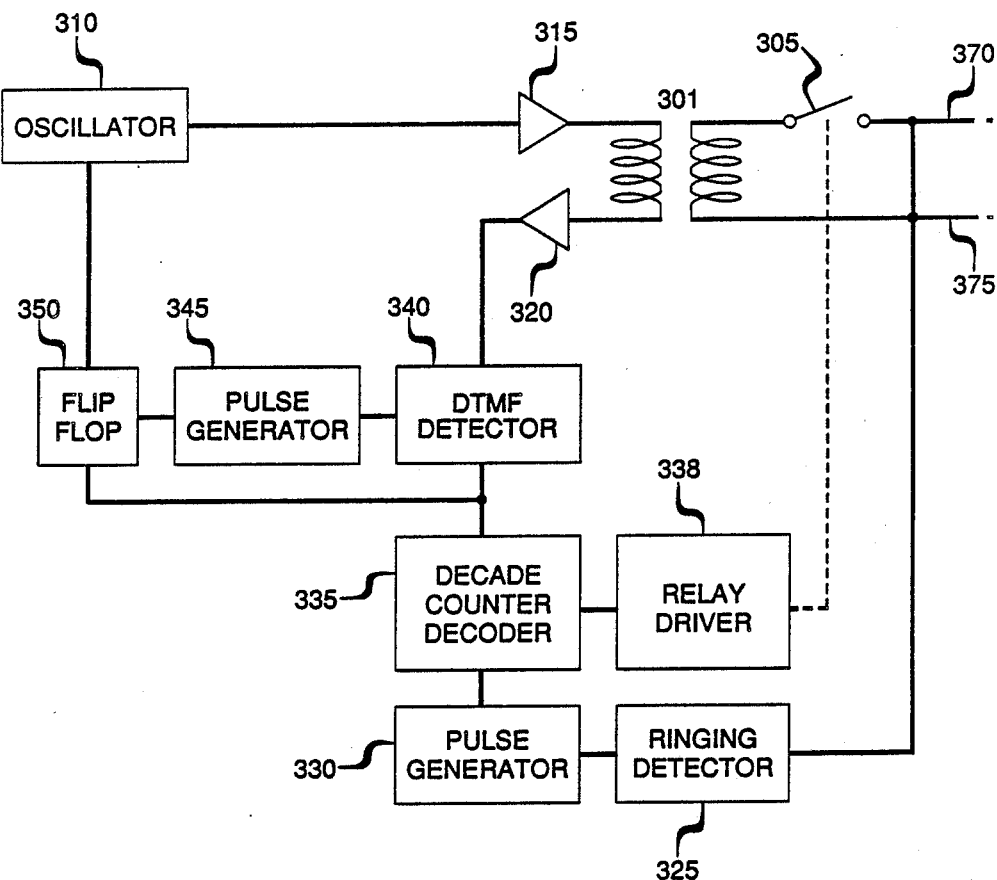
FIG. 3 is a block diagram of a circuit that may be used as the receive transponder in the arrangement of FIG. 1.
Figure 5:
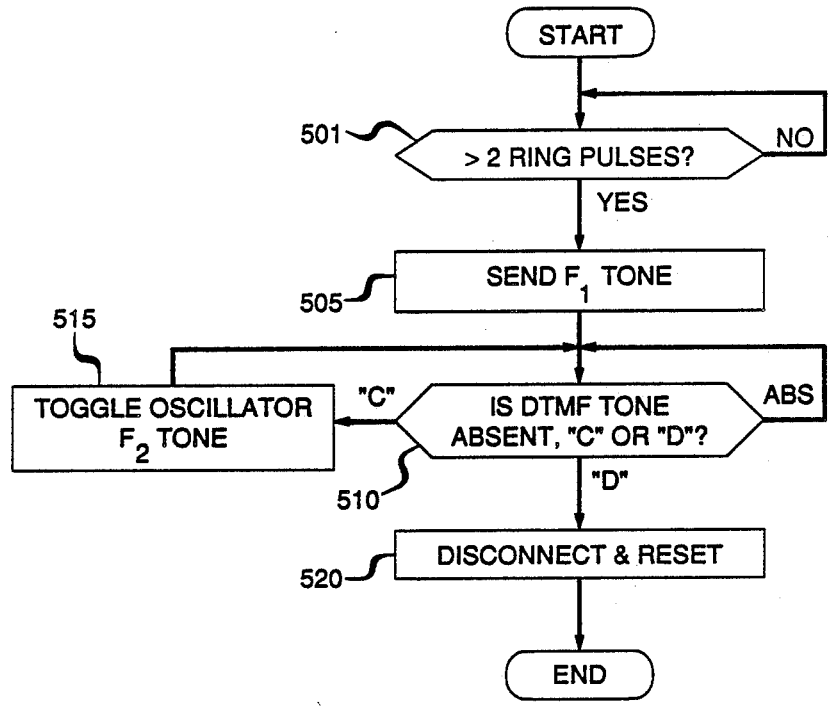
FIG. 5 is a flowchart illustrating the operation of the receive transponder circuit of FIG. 3.

FIG. 3 shows a block diagram of receive transponder 130 of FIG. 1 and the flowchart of FIG. 5 illustrates its operation. The receiver transponder comprises ringing detector 325, pulse generator 330, decade counter decoder 335 and relay driver 338. Upon detection of each ringing signal on tip and ring conductors 370 and 375, pulse generator 330 increments counter 335. When the counter reaches its three state, relay driver 338 closes contact 305 to complete the connection to the transmit transponder. Oscillator 310 is set to send a 1004 Hz signal to tip and ring conductors 370 and 375 via amplifier 315 and line transformer 301 when contact 305 is closed. DTMF detector is responsive to the preset multifrequency coded signals from amplifier 320 to toggle flip flop 350 via pulse generator 345. The flip flop in turn causes oscillator 310 to toggle on and off thereby sensing a 2008 Hz burst responsive to each alternate received multifrequency coded signal. The burst is turned off when the next multifrequency coded signal is detected. The receive transponder may also be arranged to provide a 2008 Hz burst for each multifrequency coded signal.

Referring to the flowcharts of FIGS. 4 and 5, call process controller 280 closes contact 250. When a dial tone is detected, a pre-programmed number is outpulsed. If a busy tone is detected in detector 215, a BT signal therefrom activates line disconnect circuit 240. The disconnect circuit signals controller 280 to open contact 205. Contact 205 is then closed to drop the seized circuit connections and re-attempt the call. If a dial tone is detected, detector 215 signals controller 280 to direct the generation of multifrequency signals to dial receive responder 130 (step 401). In response, ringing current is applied to receive transponder 130. As per step 501 of FIG. 5, ringing detector 325 activates pulse generator 330 on each detected ring. Decade counter decoder 335 is incremented by the outputs of pulse generator 330. When more than two ringing pulses are received, contact 305 is closed and an $f_1$ tone (1004 Hz) is applied to the connected path via amplifier 315 and line transformer 301 (step 505).

When the $f_1$ tone is received by transmit transponder 101, step 410 is entered from step 405 in FIG. 4. As per step 410, 1004 Hz detector 210 in FIG. 2 sends a pulse to test duration timer 225. The duration timer resets $f_2$ (2008 Hz) event counter 235 and starts timing of the multifrequency coded signal sequence by enabling DTMF signal toggle generator 230. DTMF generator 230 produces a pulse which is sent to DTMF generator 205 and to counter 235. The DTMF generator produces a multifrequency coded "C" signal (step 420 in FIG. 4) which is applied to line 140 in FIG. 1 and counter 235 is incremented (step 425).

During delay 430, the "C" multifrequency code is applied to DTMF detector 340 in FIG. 3 (step 510). Flip flop 350 is toggled and oscillator 310 either initiates or terminates an $f_2$ (2008 Hz) tone as per step 515. The start of an $f_2$ tone detected in detector 220 of FIG. 2 resets counter 235. In the flowchart of FIG. 4, the presence of the $f_2$ tone at step 434 resets the $f_2$ "C" count signal in step 440. As long as the test duration timer is in its active state and a 2008 Hz tone burst is repeatedly detected in step 435, steps 420 through 445 are repeated. When the test duration timer resets after a predetermined time, line disconnect circuit 240 is enabled and causes dial process controller to disconnect the connection. This is done first at receive transponder 130 by sending a multifrequency coded "D" to the receive transponder. When DTMF detector 340 in FIG. 3 detects the "D" multifrequency signal, decade counter 335 and flip flop 350 are reset. Contact 305 is opened and the receive transponder is disconnected from the line (step 520 of FIG. 5). Call processor 280 then opens relay 250 for approximately 5 seconds which disconnects the transmit transponder and drops all connections of the call. The foregoing process is repeated for an extended period of time.

If there is a cut-off problem in the established connection, an $f_2$ tone burst is not detected in detector 220 (step 435 of FIG. 4). Event counter 235 is not reset in step 440. Instead, the state of event counter 235 is tested in step 450. After a succession of K multifrequency coded "C" signals are sent without the return of an $f_2$ tone burst, step 460 is entered from step 450. The K output of event counter 235 sets K state detector 238. Line disconnect circuit is inhibited by the K state detector and an alert indication is set. The established connection is held so that the equipment in the defective connection path may be tested.

The invention has been described with reference to an illustrative embodiment thereof. It is apparent, however, that various modifications and changes may be made by one skilled in the art without departing from the spirit and scope of the invention.

I claim:

1. A method for detecting connection cut-off in a communication network comprising the steps of:

establishing a connection through the network between a first terminal and a second terminal;

generating a sequence of first signals at the first terminal and applying the first signals to the established network connection;

at the second terminal, generating a second signal responsive to receipt of a first signal at the second terminal from the established connection and applying the second signal to the established network connection; and at the first terminal, producing a signal corresponding to the difference between the number of first signals applied to the established connection and the number of second signals received from the established connection, and maintaining the established connection responsive to the difference signal exceeding a predetermined number.

2. A method for detecting connection cut-off in a communication network according to claim 1 wherein the difference signal producing step comprises:

counting the number of first signals generated at the first terminal; and resetting the first signal count responsive to the received second signals.

3. A method for detecting connection cut-off in a communication network according to claim 2 wherein the step of maintaining the established connection comprises detecting the occurrence of a first signal counter greater than the predetermined number.

4. A method for detecting connection cut-off in a communication network according to claim 1 wherein the step of generating the first signals comprises:

defining a prescribed time interval response to the establishing of the connection between the first and second terminals; and periodically producing first signals during the prescribed time interval.

5. A method for detecting connection cut-off in a communication network according to claim 4 further comprising the step of disconnecting the established connection responsive to the difference signal being less than the predetermined number at the termination of the prescribed time interval.

6. A method for detecting connection cut-off in a communication network according to claims 1, 2, 3, 4 or 5 wherein the communication network is a telephone network, the first signal is a first predetermined voice frequency signal and the second signal is a second predetermined voice frequency signal.

7. A method for detecting connection cut-off in a communication network according to claim 6 wherein the first predetermined voice frequency signal is a multifrequency signal pulse and the second predetermined voice signal is a frequency signal burst.

8. A circuit arrangement for detecting connection cut-off in a communication network comprising:

a communication network including at least first and second terminals;

means for establishing a connection through the network between the first terminal and the second terminal;

means for generating a sequence of first signals at the first terminal and for applying the first signals to the established network connection;

means at the second terminal responsive to receipt of a first signal from the established connection for generating a second signal and for applying the second signal to the established network connection;

means at the first terminal responsive to the first signals and the second signals received from the established connection for producing a signal corresponding to the difference between the number of first signals generated at the first terminal and the number of second signals received from the established connection; and means responsive to the difference signal exceeding a predetermined number for maintaining the established connection.

9. A circuit arrangement for detecting connection cut-off in a communication network according to claim 8 wherein the difference signal producing means comprises:

means for counting the number of first signals generated at the first terminal; and means responsive to the received second signal for resetting the firsrt signal count.

10. A circuit arrangement for detecting connection cut-off in a communication network according to claim 9 wherein the means for maintaining the established connection comprises means for detecting the occurrence of a first signal output greater than the predetermined number.

11. A circuit arrangement for detecting connection cut-off in a communication network according to claim 8 wherein the means for generating the first signals comprises:

means responsive to the establishing of the connection between the first and second terminals for defining a prescribed time interval; and means for periodically producing first signals during the prescribed time interval.

12. A circuit arrangement for detecting connection cut-off in a communication network according to claim 11 further comprising means responsive to the difference signal being less than the predetermined number at the termination of the prescribed time interval for disconnecting the established connection.

13. A circuit arrangement for detecting connection cut-off in a communication network according to claims 8, 9, 10, 11 or 12 wherein the communication network is a telephone network, the first signal is a first predetermined voice frequency signal and the second signal is a second predetermined voice frequency signal.

14. A circuit arrangement for detecting connection cut-off in a communication network according to claim 13 wherein the first predetermined voice frequency signal is a multifrequency signal pulse and the second predetermined voice signal is a frequency signal burst.

15. A transponder circuit for detecting connection cut-off between first and second terminals in a communication network comprising:

means at one of the first and second terminals for establishing a connection between the first and second terminals, means at the one of the first and second terminals responsive to the establishing of the connection for generating a sequence of first signals, means at the one of the first and second terminals for counting the first signals, means for applying the first signals to the established connection via the one of the first and second terminals, means for detecting second signals from the other of the first and second terminals of the established connection, means at the one of the first and second terminals responsive to the first and second signals for generating a signal corresponding to the difference between the number of first signals and the number of second signals, and means responsive to the difference signal exceedng a predetermined number for maintaining the established connection.

16. A transponder circuit for detecting connection cut-off between first and second terminals in a communication network according to claim 15 wherein the difference signal generating means comprises means responsive to receipt of the second signals from the established connection for resetting the first signal counting means.

17. A transponder circuit for detecting connection cut-off between first and second terminals in a communication network according to claim 16 wherein the means for maintaining the established connection comprises means for detecting the occurrence of a first signal count greater than the predetermined number.

* * * * *